Aug. 17, 1965   P. MENEGONI   3,200,483
PULLER WITH ADJUSTABLE PULLER ARMS PROVIDED WITH
DIFFERENT SIZE CLAWS AND A CENTRALLY LOCATED
THREADED MEANS TO ENGAGE THE WORK
Filed March 27, 1964

INVENTOR.
PRIMO MENEGONI

BY
ATTORNEYS.

United States Patent Office 3,200,483
Patented Aug. 17, 1965

3,200,483
PULLER WITH ADJUSTABLE PULLER ARMS PROVIDED WITH DIFFERENT SIZE CLAWS AND A CENTRALLY LOCATED THREADED MEANS TO ENGAGE THE WORK
Primo Menegoni, 39—25 65th St., Woodside, N.Y.
Filed Mar. 27, 1964, Ser. No. 355,277
1 Claim. (Cl. 29—259)

The present invention relates to an improved gear pulling device and pulling arm.

In the past various devices have been used to pull gears or bearings off shafts. The general principle of such devices usually has included a flange, a screw mechanism through which the screw mechanism passed and a pair of arms with claws or grip to grasp the gear.

Means in the past had been devised to adjust the mechanism to various sized gears on shafts but such efforts have either been cumbersome, expensive to produce, time consuming to adjust and none of the means in the past were adapted to pull gears and bearings of various sizes, protecting the gear or bearing from breakage in pulling.

Pulling of a bearing with an arm on a gear puller that rested on the outside of the race oftentimes dislodged the bearing and did not apply a pulling to the central portion of the bearing which was held lightly by the shaft.

Oftentimes in the past in the pulling of plastic or nylon gears, an inadequate grip or the pressure of pulling especially inadequately distributed, has resulted in the breaking of gear teeth to the detriment of the reusability of the pulled gear.

According to the present invention a simple, modular easily adjustable gear puller is provided adapted to pull a variety of different sized and shaped gears and bearings on different length shafts with a minimum risk damage to the object pulled.

Although such novel feature or features believed to characteristic of the invention are pointed out in the claim, the invention and the manner in which it may be carried out, may be further understood by reference to the description following and the accompanying drawings.

Referring now to the figures in greater detail, where like reference numbers denote like parts in the various figures.

Figure 1:
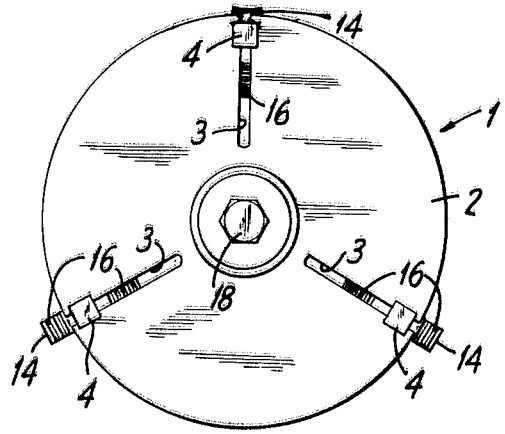
FIG. 1 is a plan view of the puller of the present invention.

The puller 1 comprises a flange 2 having equidistant slots 3 which are adapted to hold arms 4.

The arms 4 are identical and have spaced indentations 5 which fit into the slots 3.

Figure 2:
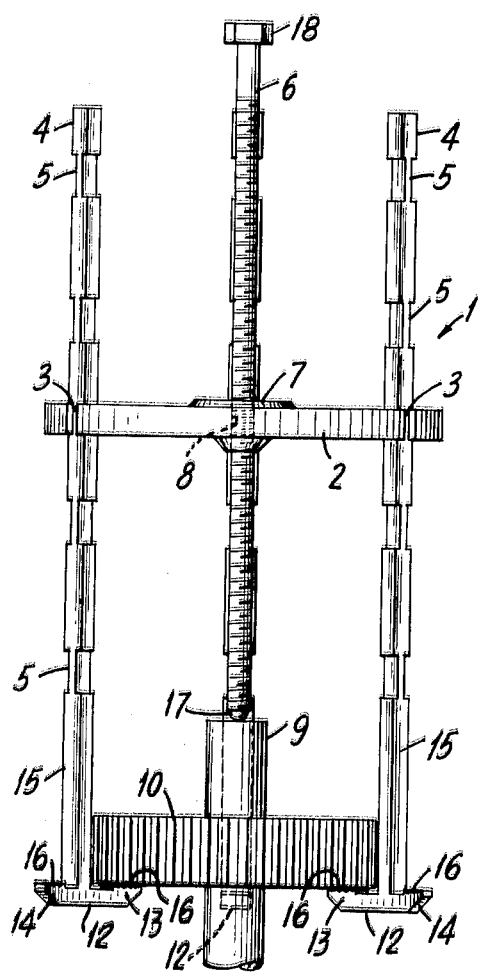
FIG. 2 is a front elevation of FIG. 1 holding a gear
Figure 3:
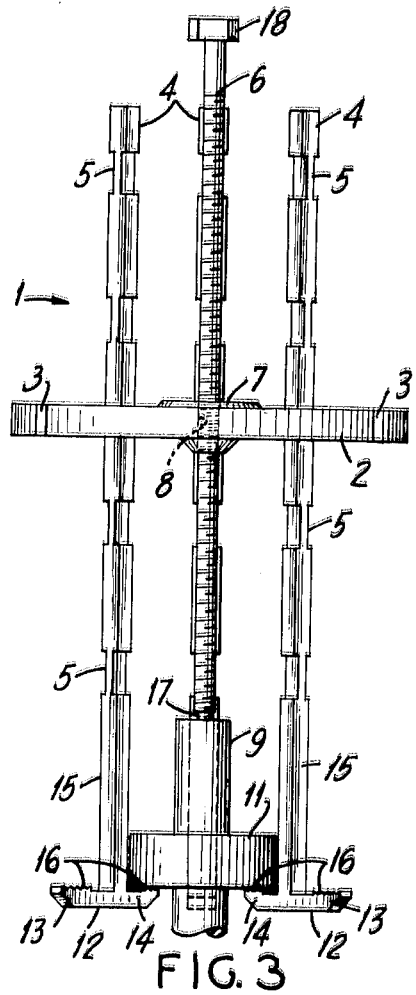
FIG. 3 is another view of the present invention with arms reversed for pulling a bearing.
Figure 4:
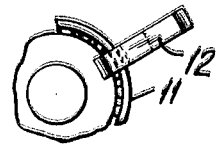
FIG. 4 is a detail of FIG. 3 showing the claws grasping a bearing.

A long thread screw 6 passes through the center of the flange 2. The flange center 7 has internal threads 8 so that the screw can be raised or lowered to be brought to bear on a shaft 9 on which is mounted a gear 10 as shown in FIG. 2 or a bearing 11 as shown in FIGS. 3 and 4. The center of the flange 2 may be reinforced as shown.

The arms 4 are provided with ends 12 having a plurality of claws 13, 14 of different length extending from the shank 15 of the arms 4. So that the claws 13, 14 may grasp tightly they are provided with gripping ridges 16. The claws 13, 14 with the ridges 16 form a small U with relation to the shank 15.

In use the arms 4 are positioned into the slots 3 at selected indentations 5 which bring the screw 6 closest to the end of the shaft 9 when all of the arms 4 are in engagement with the object to be pulled. A simple manual adjustment may then be made to tighten the end 17 of the screw 6 against the shaft 9. The screw end 17 is preferably rounded to give it a bearing surface to rotate against the shaft 9. The top of the screw 6 is provided with a nut head 18 which may be turned with a wrench (not shown) to bring pressure on the shaft pulling the object off the shaft 9.

As shown in FIGS. 3, 4, the short claw 14 is brought to bear on the inner ring of a bearing 11 avoiding the stress on the delicate race and ball bearings in the bearing 11.

The V configuration of the claws 13, 14 serves the further function of protecting the object being pulled. In many instances the peripheral portion of a gear which contains the teeth is a wide portion while the entire portion of the gear may be recessed. The U of the claws 13, 14 may permit grasping the inner section of a gear without the claws 13, 14 having to exert pressure with more delicate tooth structure. This is especially important with plastic gears.

The indentations 5 permit the arms 4 to be set up near the object with the claws 13, 14 in desired position for the best grip. This is effected by sliding the arms 6 in the slots. The positioning of the puller 1 is done in a minimum of time. The screw 6 moving slowly, can be set by the arm 4, adjustment requiring only a few turns to have it in position, thus saving time.

The actual removal of an object is usually effected by a wrench providing additional leverage for rotating the screw 6 to pull the object and push the shaft 9 through the center of the object to release it.

The use of equidistant spaced arms 4 distribute the stress on the object pulled for easier uniform pulling protecting the object pulled. While the preferred embodiment shows a circular flange 2 with three slots, and three arms 4, it would be within the spirit of the present invention to be more than two slots.

The novel arms 4 may operate in pairs but for best effectiveness three or more arms 4 should be provided.

The terms and expressions which are employed are used as terms of description, it is recognized, though, that various modifications are possible within the scope of the invention claimed.

Having thus described certain forms of the invention in some detail, what is claimed is:

A pulling device comprising a circular flange portion including; a plurality of equidistant radial slots of optional length; and a central threaded portion, a screw adapted to fit in said flange threaded portion said screw including; a threaded portion; and end portion adapted to rotate against a shaft end; and a means for grasping said screw for rotating it, and a plurality of pulling arms each including; a shank portion; a plurality of indentations in said shank portion adapted to fit into said flange slots; a plurality of claw portions of different lengths on each of the ends of said pulling arms; said claw portions including grasping means; said plurality of claw portions on each said pulling arm being identical and forming a U with said shank portion, said pulling arm set in said flange portion whereby said claws each extend an equal distance from said flange.

References Cited by the Examiner

UNITED STATES PATENTS

| | | | |
|---|---|---|---|
| 1,123,513 | 1/15 | Gailiard | 29—261 |
| 1,589,015 | 6/26 | Lee | 29—261 |
| 2,096,345 | 10/37 | Schrem | 29—261 |
| 2,188,074 | 1/40 | Condon | 29—261 |
| 2,407,428 | 9/46 | Kretchman | 29—244 X |

FOREIGN PATENTS

| | | |
|---|---|---|
| 649,857 | 10/62 | Canada. |
| 200,880 | 7/23 | Great Britain. |
| 89,451 | 6/57 | Norway. |

WILLIAM FELDMAN, *Primary Examiner.*

MYRON C. KRAUSE, *Examiner.*